June 8, 1926.
T. C. BROWN
PEANUT PLOW
Filed May 28, 1923
1,587,694
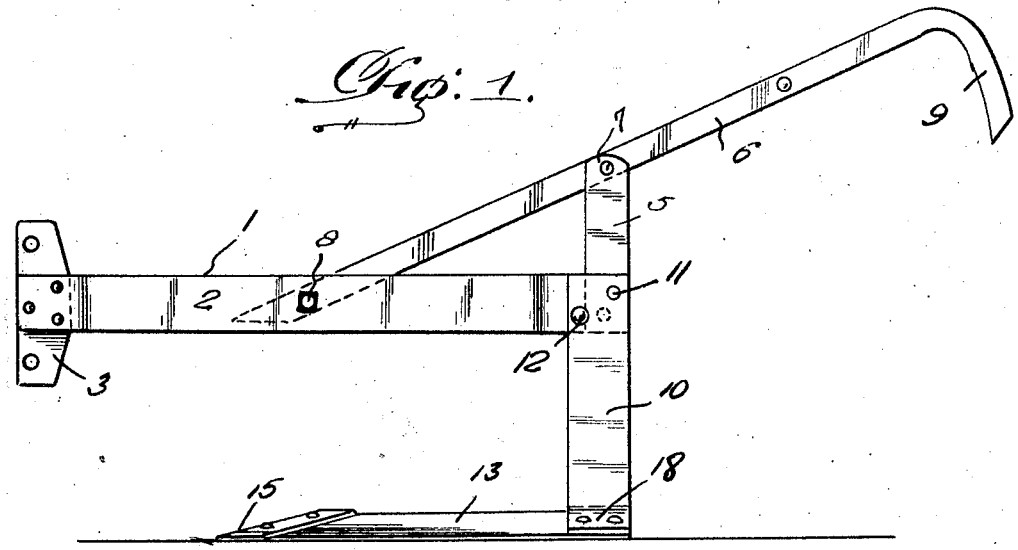
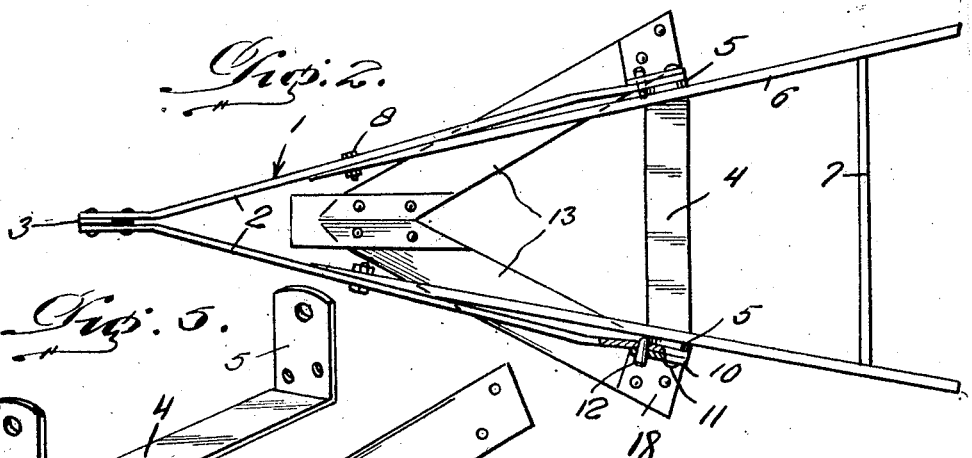
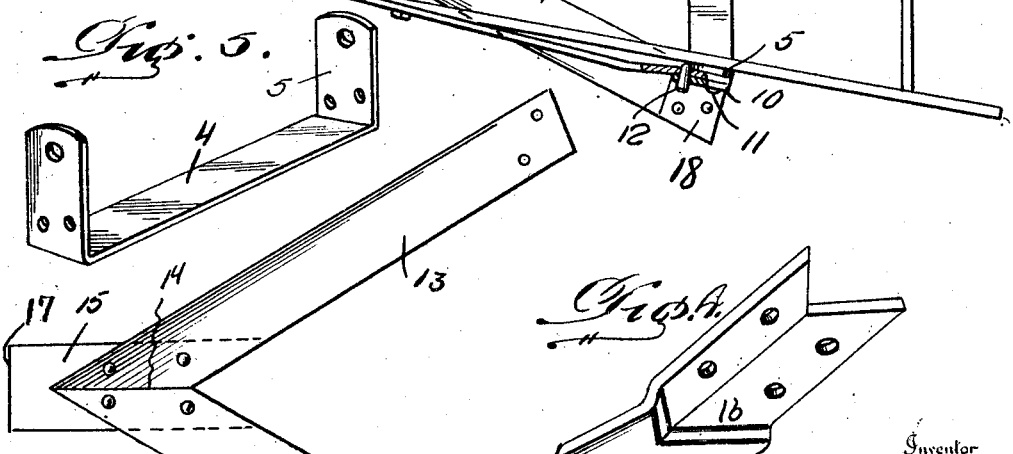
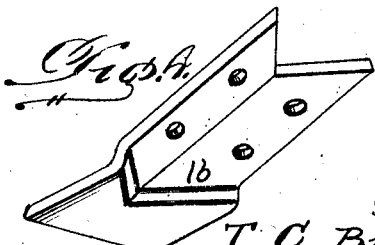
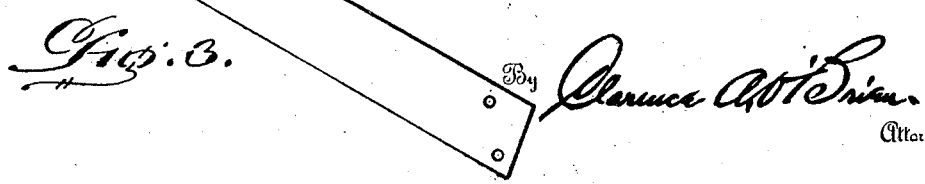
Inventor
T. C. Brown Patented June 8, 1926.

1,587,694

UNITED STATES PATENT OFFICE.

THOMAS C. BROWN, OF PLEVNA, ALABAMA.

PEANUT PLOW.

Application filed May 28, 1923. Serial No. 641,834.

This invention relates to peanut plows, and particularly a plow of the character for effectively loosening peanuts from the ground and cutting the roots to prevent loss of a portion of the crop resulting from improper plowing.

An object of the invention resides in providing a plow of the character described, having a square point adapted to engage under the formed peanuts and cut the main roots of the plants, and V-shaped cutting blades which subsequently cut the feeders of the plants at the side, and in this way loosen the plants in such a manner that they may be thrown directly upwardly with the loose dirt from the plow and substantially all of the crop recovered in an efficient manner.

Another object of the invention resides in providing a peanut plow having a square digging point and diverging cutter blades extending therefrom connected by suitable uprights with said draw bar frame, in a manner to permit the shearing of suitable pins in case the plow strikes a rock or other obstruction.

The invention also includes other objects and improvements in the details of construction and arrangement of parts, which are more particularly pointed out in the following description and claims directed to a preferred form of the invention, it being understood, however, that variations may be made in the specific construction, arrangement, and assemblage of the parts, without departing from the scope and spirit of the invention as described and claimed.

In the drawings, forming a part of this application:

Figure 1 is a side elevation of the peanut plow constructed according to this invention.

Figure 2 is a plan view thereof.

Figure 3 is a bottom plan view of a cutter blade and digger point.

Figure 4 is a detail perspective view of the digger point.

Figure 5 is a detail perspective view of the plow beam reinforcing bracket.

The plow beam or frame structure is indicated generally at 1, and includes a pair of bars 2, secured at one end to the opposite side of a draw bar 3, the other ends diverging from one another and being secured together at the rear end by a spacing and reinforcing member 4, extending between the separated ends of the bars, and having upturned ends 5, which form a support for the central portion of the handle bars 6, secured thereto by a suitable means indicated at 7, having the forward ends extending downwardly and converging to the central portion of the bars 2, to which they are secured as indicated at 8, while the rear ends of the bars extend upwardly and outwardly relative to each other and are formed in the handle portions 9. Vertical side bars 10 are secured and depend from the rear end of the bars 2 on pins 11, which pivotally mount said side bars to the bars 2, while wooden pins 12 inserted through normally aligned openings in the side bars and the bars 2, normally hold said bars in vertical positions with respect to the bars 2, and the function of which will be presently pointed out.

The cutter blades 13 are inclined relative to one another, and arranged in V-form, with their forward ends abutting as indicated at 14 and secured to a digging point 15, the end edges of the cutter blades abutting the walls of a suitable recess 16, formed in the upper end of said digging point, while the forward end of the digging point extends below and forwardly of the forward ends of the cutter blades, and is squared as indicated at 17, for a purpose which will presently appear. The rear ends of the cutter blades 13 are secured to the outwardly and downwardly inclined ends 18 of the vertical side bars 10 and support the cutter blades and digging point in proper relation with respect to the frame 1.

With a peanut plow constructed as above described, it will be seen that a suitable connection may be made with the draw bar 3, so that the same may be pulled by horses or a tractor, and an operator holding the handle portions 9 may direct the same below the surface of the ground so that the digging point 15 and the cutter blades 13 will be directed under a row of peanut plants, so that the digging point will first engage the main roots of the plants of the row, and by reason of the squared end thereof will break or cut the main roots of the plants before the cutter blades engage the feeder roots which extend out to the sides of the plants in the row, so that the main roots are first separated by the digger point and then the feeder roots, are separated by the cutter blades to throw the portion of the plant carrying the peanut upwardly toward the top of the soil, which enables it to be readily removed by a fork or the like from the loose soil. In this way, the plant roots are effectively severed below the portions carrying the peanuts and the plants raised in the loose soil, in order that practically all of the crop of peanuts are recovered without injuring or losing the same, and in an expeditious manner. During the plowing operation to dig and raise the peanut plants from the soil, if the digging point 15 of the cutter blade 13 should strike a rock or other obstruction in the soil, which might damage the plow, the force with which the digging point or cutter blade strikes the object will cut the wooden pin 12 securing the side bars 10 to the frame bars 2, and permit the swinging movement of the cutter bars, digging point and side bars on the pins 11 as pivots, so that the plow will not be injured or the parts thereof broken as a result of such engagement with a stone or other object in the soil.

It will therefore be clear that a simple and inexpensive form of plow structure has been provided, for use in plowing out peanuts for recovering substantially the whole crop, and preventing injury to the plow structure, in the event that it strikes a rock or other obstruction in the soil.

What is claimed is:

1. A peanut plow including a frame formed with a pair of bars secured together at their front ends to the opposite sides of the draw bar, and diverging rearwardly, a securing and spacing bar mounted between the rear ends of said frame bars securing them in spaced relation, said securing bar having vertically extending end portions, handle bars secured to the central portions of said frame bars and the upper ends of said vertically extending portions of the spacing bar, side bars pivotally mounted on said frame bars at the rear ends thereof and normally extending downwardly therefrom, a pair of cutter bars secured to said side bars and converging toward their forward ends and terminating in substantial contact with one another, a digging point secured to the forward ends of said cutter bars for holding said bars in inclined relation with one another, and breakable means for normally holding said side bars in vertically extending relation with said frame bars.

2. A peanut plow of the class described comprising a frame structure, a pair of cutter bars secured to the frame structure and converging toward their forward ends and terminating in substantial contact with one another, and a digging point in the form of a flat plate having a reduced extension to provide a V-shaped wall between the reduced extension and the remaining flat portion of the plate, the adjacent terminals of the cutter bars being secured to the reduced portion of the plate and having their ends beveled to abut the sides of the V-shaped wall.

In testimony whereof I affix my signature.

T. C. BROWN.